US006483517B1

(12) United States Patent
Kang (10) Patent No.: US 6,483,517 B1
(45) Date of Patent: Nov. 19, 2002

(54) CIRCUIT FOR REGULATING BRIGHTNESS AND SIZE OF PICTURE IN DISPLAY APPARATUS

(75) Inventor: Ho-Woong Kang, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/503,241

(22) Filed: Feb. 14, 2000

(30) Foreign Application Priority Data

Feb. 13, 1999 (KR) .............................................. 99-5286

(51) Int. Cl.[7] ................................................. G09G 5/10

(52) U.S. Cl. ............................ 345/589; 345/20; 345/22

(58) Field of Search ................................. 345/589, 590, 345/204, 10, 11, 12, 20, 22, 660

(56) References Cited

U.S. PATENT DOCUMENTS 6,091,397 A * 7/2000 Lee ............................. 345/589

* cited by examiner

*Primary Examiner*—Matthew Luu
(74) *Attorney, Agent, or Firm*—Robert E. Bushnell, Esq.

(57) ABSTRACT

A circuit for regulating the brightness and size of picture in a display apparatus is disclosed, in which a picture brightness regulating circuit and a picture size regulating circuit are organically coupled together, and the picture brightness and size are decided by utilizing composite adjusting signals of a microcomputer. The display apparatus receives and amplifies RGB signals from a computer main body to output them to a cathode ray tube, supplies a high voltage from a fly back transformer to the cathode ray tube, and carries out horizontal deflections by a horizontal deflecting circuit. The circuit for regulating the brightness and picture size in the display apparatus according to the present invention includes the following elements. A current sensing section senses the intensities of beam currents incoming into the cathode ray tube. A microcomputer decides the lower limit of a terminal voltage if the terminal voltage is lowered, the terminal voltage being anti-proportional to the beam current as sensed by the current sensing section. A brightness and picture size regulating circuit section decides the upper limit of the terminal voltage in relation to an internal power and an internal impedance of a video pre-amplifier. Further, it outputs brightness regulating signals to the video pre-amplifier to adjust a clamp level of RGB video signals if the terminal voltage departs from the lower limit of the microcomputer. Still further, it outputs horizontal/vertical size regulating signals to a deflecting circuit section to regulate the picture size. Therefore, the maximum brightness restriction line and the picture size regulating degree are decided by the composite adjusting signals of the microcomputer. As a result, the manufacturing time can be saved during the manufacture of the display apparatus, and therefore, the productivity can be improved. Further, the constitution of the brightness and picture size regulating circuit section is very simple, and therefore, the economy is improved during its designing.

15 Claims, 5 Drawing Sheets

CIRCUIT FOR REGULATING BRIGHTNESS AND SIZE OF PICTURE IN DISPLAY APPARATUS

CLAIM FOR PRIORITY

This application makes reference to, incorporates the same herein, and claims all benefits accruing under 35 U.S.C. §119 from an application for ALC And Size Regulation Circuit Of Display Apparatus earlier filed in the Korean Industrial Property Office on the 13$^{th}$ of Feb. 1999, and there duly assigned Ser. No. 5286/1999, a copy of which application is annexed hereto.

FIELD OF THE INVENTION

The present invention relates to a display apparatus. More specifically, the present invention relates to a circuit for regulating the brightness and size of picture in a display apparatus, in which a picture brightness regulating circuit and a picture size regulating circuit are organically coupled together, and the picture brightness and size are decided by utilizing composite adjusting signals of a microcomputer, in view of the fact that the picture brightness and size are decided by the beam currents flowing from a fly back transformer to a cathode ray tube.

DESCRIPTION OF THE RELATED ART

Generally, the brightness regulating circuit of a display apparatus prevents the brightness level of picture from rising too high, so that the picture brightness of the display apparatus would be constant all the time. Therefore, the intensities of the beam currents which are supplied to the cathode ray tube are fed back to the brightness regulating circuit. Thus if the intensity of the feedback beam current is higher than a certain level, then the clamp levels of the RGB video signals which are inputted into the brightness regulating circuit are made to be restricted by a predetermined level, so that the intensities of the beam currents would not rise any more.

Meanwhile, the picture size regulating circuit of the display apparatus regulates the picture size which is varied in accordance with the variation of the high voltage. This picture size regulating circuit is generally applied to a high voltage/horizontal deflection integral type display apparatus in which the high voltage is not constant, and in which the picture size is varied in accordance with the intensity of the beam current.

In other words, if the high voltage is varied, then the picture size is varied, and if the high voltage is varied, then the intensities of the beam currents are also varied. As described above, there is a close relationship between the variation of the high voltage and the variation of the intensities of the beam currents. Therefore, the picture size regulating circuit detects any variation of the intensities of the beam currents, and decides the picture size based on the detected intensities of the beam currents. Therefore, this picture size regulating circuit can easily regulate the picture size in the high voltage/horizontal deflection integral type display apparatus.

What is needed is the maximum brightness restriction line and the picture size regulating degree are decided by the composite adjusting signals of the microcomputer. Therefore, the manufacturing time can be saved during the manufacture of the display apparatus, and therefore, the productivity can be improved. Further, the constitution of the brightness and picture size regulating circuit section is very simple, and therefore, the economy is improved during its designing.

SUMMARY OF THE INVENTION

Therefore it is an object of the present invention to provide a circuit for regulating the brightness and picture size in a display apparatus, in which a picture brightness regulating circuit and a picture size regulating circuit are organically coupled together, and the picture brightness and size are decided by utilizing composite adjusting signals of a microcomputer.

In achieving the above object, in a display apparatus for receiving and amplifying RGB signals from a computer main body to output them to a cathode ray tube, for supplying a high voltage from a fly back transformer to the cathode ray tube, and for carrying out horizontal deflections by a horizontal deflecting circuit, the circuit for regulating the brightness and picture size for the display apparatus according to the present invention includes: a current sensing section for sensing intensities of beam currents incoming into the cathode ray tube; a microcomputer for deciding a lower limit of a terminal voltage if the terminal voltage is lowered, the terminal voltage being anti-proportional to the beam current as sensed by the current sensing section; and a brightness and picture size regulating circuit section for deciding an upper limit of the terminal voltage in relation to an internal power and an internal impedance of a video pre-amplifier, for outputting brightness regulating signals to the video pre-amplifier to adjust the clamp level of RGB video signals if the terminal voltage departs from the lower limit of the microcomputer, and for outputting horizontal/vertical size regulating signals to a deflecting circuit section to regulate a picture size.

In the conventional display apparatus, a brightness regulating circuit and a picture size regulating circuit are separately made. And brightness regulating signals and horizontal/vertical size regulating signals inputted to the brightness regulating circuit and a picture size regulating circuit are outputted separately from the microcomputer. However, in the present invention, brightness and picture size regulating circuit section is made as one circuit and composite adjusting signals outputted from a microcomputer are inputted into the brightness and picture size regulating circuit section in order to adjust brightness and picture size of a monitor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
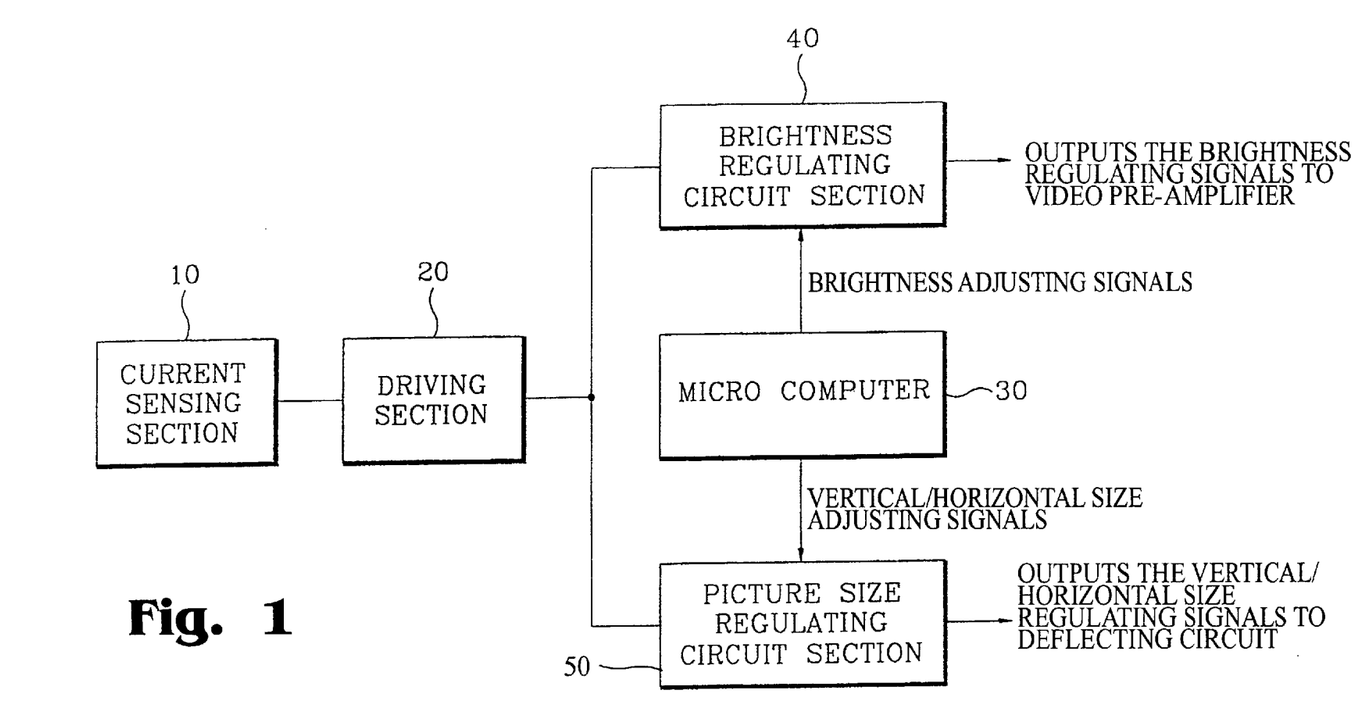
FIG. 1 is a block diagram showing the constitution of the conventional automatic picture brightness and size regulating circuit for a display apparatus.
Figure 2:
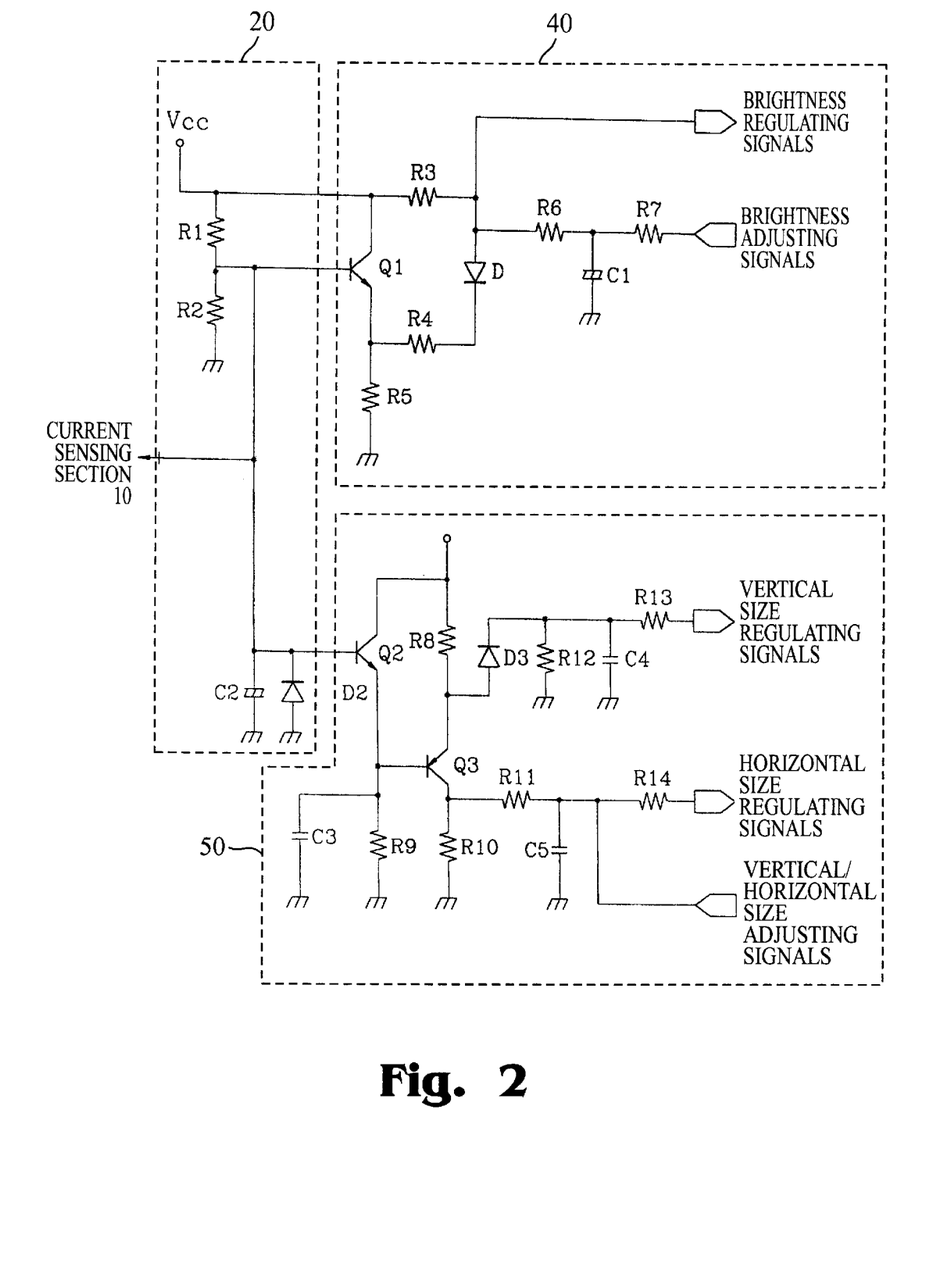
FIG. 2 is a detailed circuit diagram for the circuit of FIG. 1.
Figure 3:
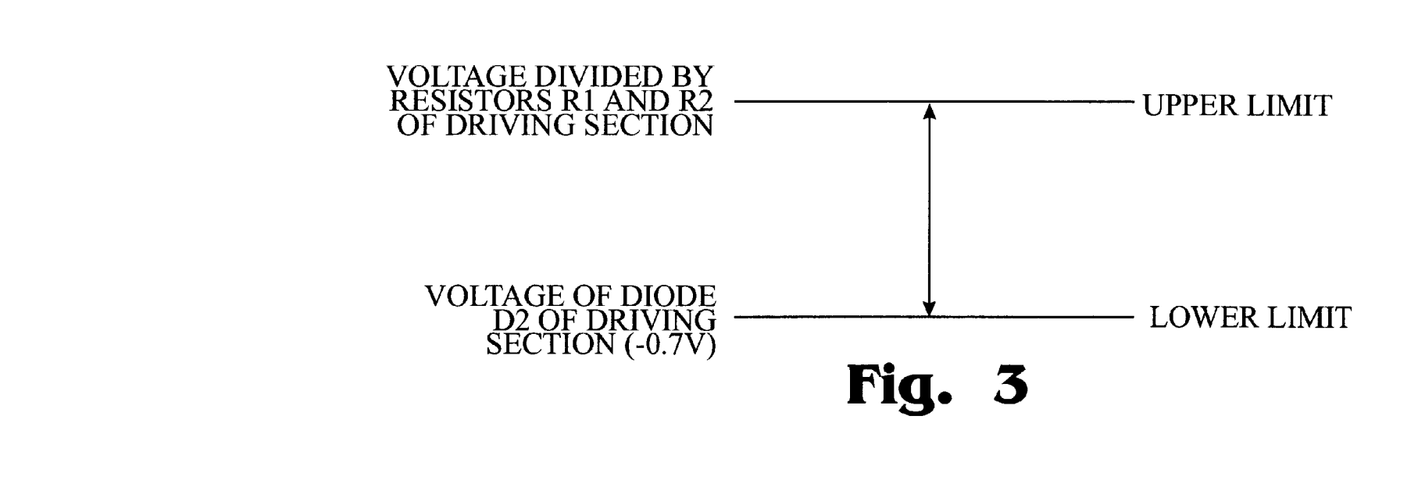
FIG. 3 illustrates the upper and lower limits of the conventional picture brightness and size regulating unit.

FIG. 1 is a block diagram showing the constitution of the conventional picture brightness and size regulating circuit for a display apparatus. FIG. 2 is a detailed circuit diagram for the circuit of FIG. 1. FIG. 3 illustrates the upper and lower limits of the conventional picture brightness and size regulating circuit.

The constitution of the conventional picture brightness and size regulating circuit will be described referring to FIGS. 1 to 3. A current sensing section 10 senses the intensities of the beam currents which flow from an FBT (flyback transformer) to a cathode ray tube. A driving section 20 outputs voltages which are anti-proportional to the intensities of the beam currents which are derived from the current sensing section 10. The driving section 20 includes resistors R1 andR2 and a diode D2, and the resistors R1 and R2 decide the upper limit of the voltages which are outputted anti-proportionally to the intensities of beam currents, while the diode D2 decides the lower limit of the voltages.

A microcomputer 30 outputs brightness regulating signals to a brightness regulating section 40, and outputs horizontal/vertical size regulating signals to a picture size regulating section 50.

The above mentioned brightness regulating signals are for deciding the brightness restricting limit. The brightness restricting limit is that which has been decided by the supervisor at the production line by directly measuring the brightness by means of an automatic measuring instrument.

The horizontal/vertical size regulating signals which are inputted into the picture size regulating section 50 are for regulating the derived signals which are derived by the current sensing section 10 from the intensities of the beam currents by varying the regulating degree. The horizontal vertical size regulating signals make it possible to adjust the regulating degree.

The horizontal/vertical size regulating signals are the regulation amounts which are decided by the supervisor at the production line by directly measuring the brightness by means of an automatic measuring instrument.

The brightness regulating circuit 40 receives the output voltages of the driving section 20 through a transistor Q1. If the levels of the brightness and size regulating signals which have been formed by the above described voltages are higher than a predetermined level, then the brightness regulating signals are outputted to a video pre-amplifier (not illustrated).

Then the video pre-amplifier lowers the clamp level of the RGB video signals in response to the brightness regulating signals, so that the brightness of the display apparatus would be regulated, thereby regulating the brightness of picture.

The picture size regulating circuit section 50 receives the output voltages of the driving section 20 through transistors Q2 and Q3. If the received voltage level is higher than a certain level, the horizontal/vertical size regulating signals are outputted to a deflecting circuit (not illustrated), thereby forcibly regulating the horizontal/vertical picture size.

Here, reference codes R3–R14 are resistors, C1–C5 are capacitors, and D1 and D3 are diodes.

The conventional automatic brightness and picture size regulating circuit of the display apparatus constituted as above will be described as to its operations. First, the output voltages of the driving section 20 are weakened if the intensities of the beam currents becomes high as sensed by the current sensing section 10, while they are strengthened if the latter are weakened. That is, the stronger the intensities of the beam currents become, the higher the brightness becomes, with the result that the picture becomes gradually brighter.

Under this condition, the upper limit of the output voltages of the driving section 20 is decided by the divided voltage as divided by the resistors R1 and R2, while the lower limit is decided by the diode D2. Thus the lower limit becomes about –0.7 V. Therefore, the output voltages of the driving section 20 have values between the upper limit and the lower limit. This is illustrated in FIG. 3.

Meanwhile, if the beam current as sensed by the current sensing section 10 is steeply increased, then the output voltages of the driving section are lowered. Consequently, the transistors Q1 and Q2 of the brightness regulating section 40 and the picture size regulating section 50 are turned off. Therefore, the brightness regulating section 40 outputs the brightness regulating signals of the microcomputer 30 to a video pre-amplifier (not illustrated) so as to lower the clamp level of the RGB video signals.

Thus the brightness level of the display apparatus can be prevented from becoming too high, and the picture brightness is maintained at a constant level all the time. Under this condition, the brightness adjusting signals which are outputted from the microcomputer 30 are for deciding the picture brightness restriction line. This picture brightness restriction line is a brightness level which has been measured by using an automatic instrument during the manufacture.

Like when regulating the brightness level, if the output voltages of the driving section 20 are steeply lowered, then the picture size regulating section 50 outputs the horizontal/vertical size regulating signals of the microcomputer 30 to the deflecting circuit (not illustrated), thereby forcibly regulating the picture size.

The horizontal/vertical size regulating signals of the microcomputer 30 are the regulation amounts which have been measured by using an automatic instrument during the manufacture of the display apparatus like in the case of the brightness regulating signals.

As shown in FIG. 2, the brightness regulating circuit section 40 and the picture size regulating circuit section 50 include transistors Q1, Q2 and Q3. This is for ensuring that the two circuit sections should not influence to each other when the two circuit sections receive the variations of the intensities of the beam currents from the current sensing section 10.

That is, the brightness regulating circuit section 40 regulates the brightness of the display apparatus through its own processing, while the picture size regulating circuit section 50 regulates the picture size of the display apparatus through its own processing. Thus the two sections are separated, so that there would be no mutual influence between the two circuit sections. Therefore, the circuit sections 40 and 50 can accurately operate by separately receiving the variations of the intensities of the beam currents.

However, in the above described conventional technique, the brightness regulating section 40 and the picture size regulating section 50 have complicated structures. Further, if the beam current is increased, the brightness and the picture size are regulated by receiving the horizontal/vertical size regulating signals from the microcomputer. Therefore, the brightness regulating signals and the horizontal/vertical size regulating signals have to be measured and set up during the manufacture of the display apparatus. Consequently, the time for manufacturing the display apparatus is extended, and the manufacturing operation becomes very troublesome.

Figure 4:
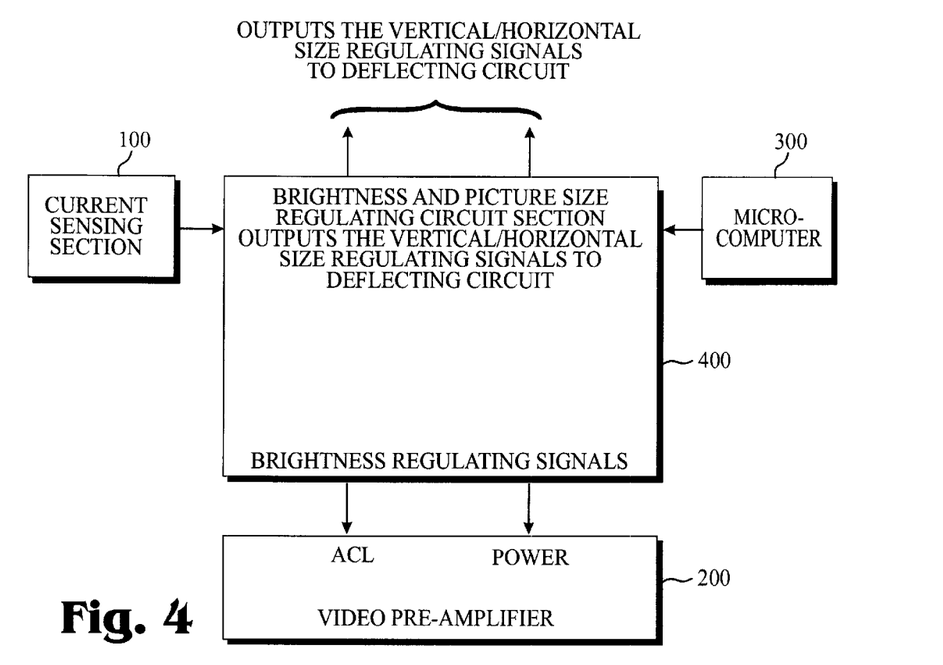
FIG. 4 is a block diagram showing the constitution of the automatic picture brightness and size regulating circuit for a display apparatus according to the present invention.
Figure 5:
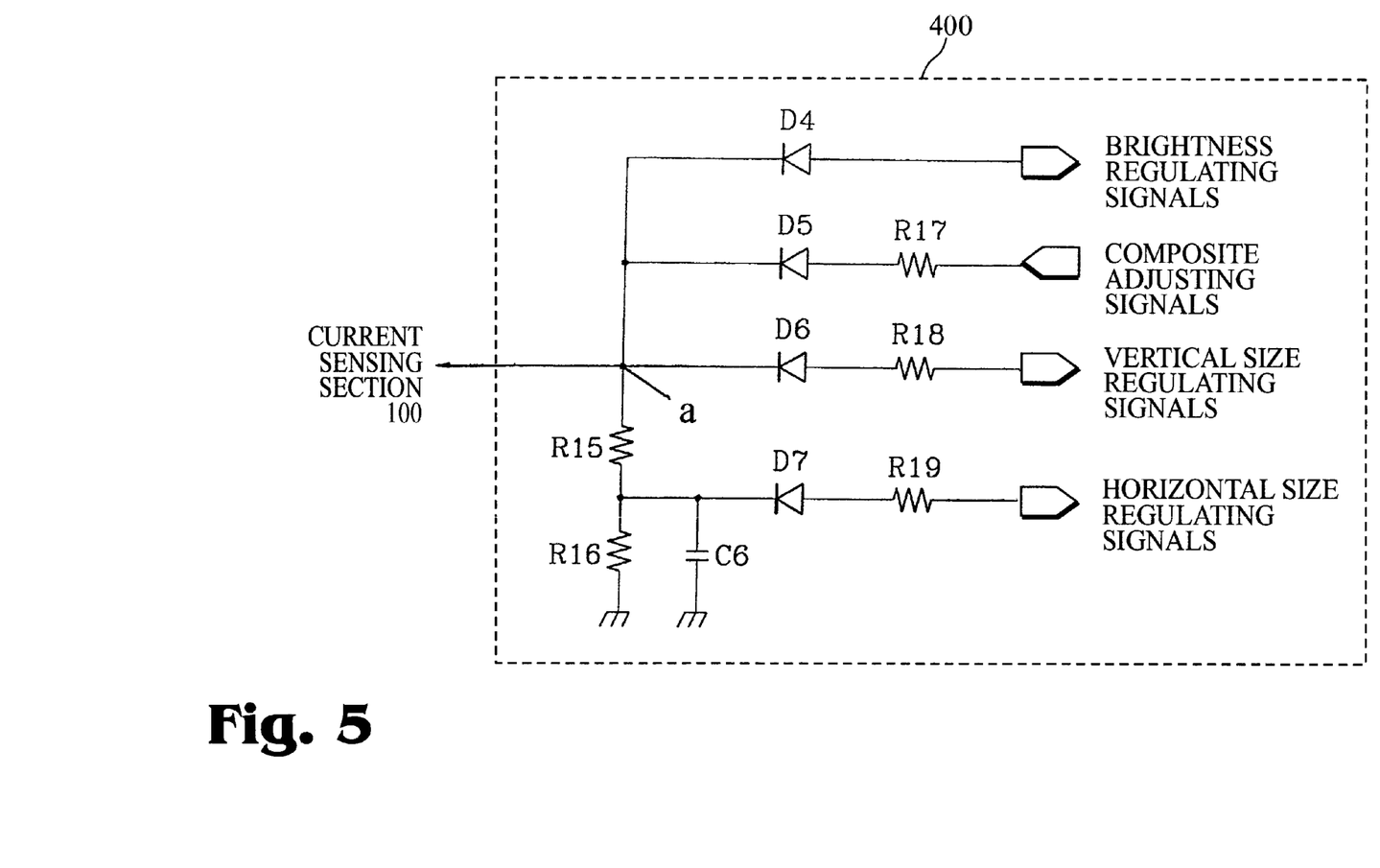
FIG. 5 is a detailed circuit diagram for the circuit of FIG. 4.
Figure 6:
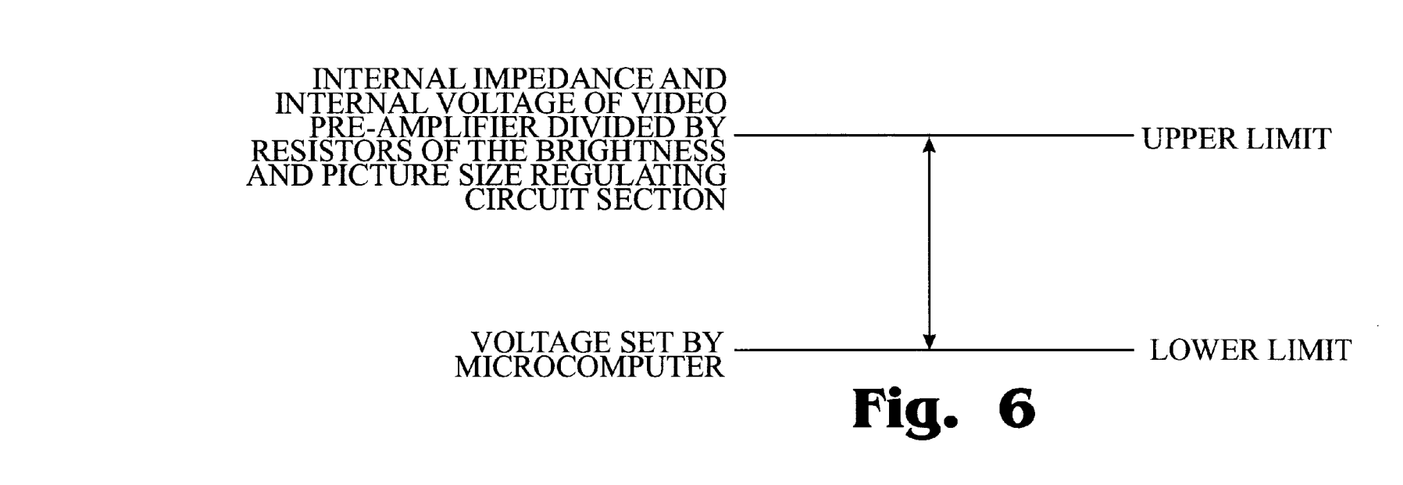
FIG. 6 illustrates the upper and lower limits of the picture brightness and size regulating circuit according to the present invention.
Figure 7:
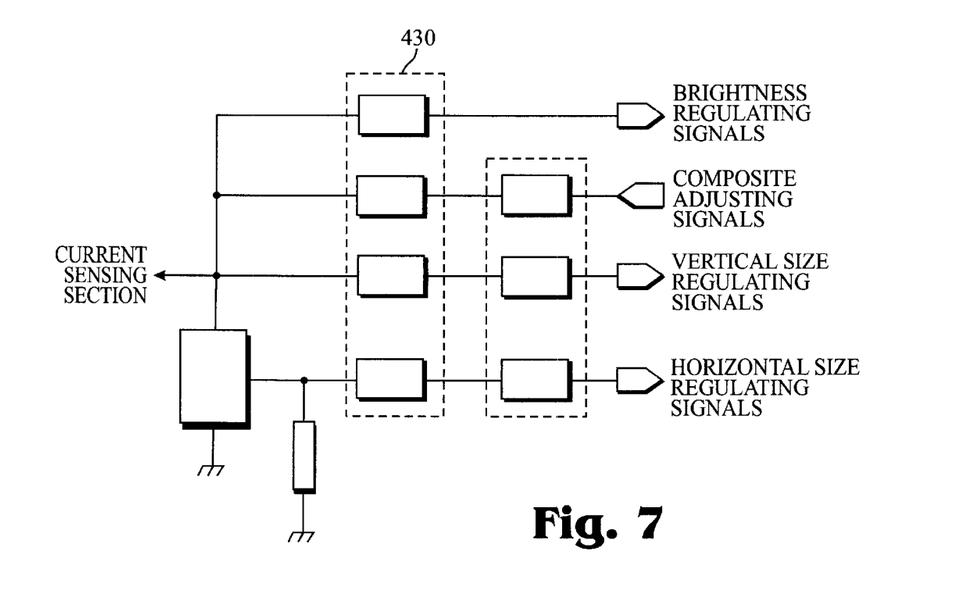
FIG. 7 is a block diagram illustrating roughly FIG. 5.

FIG. 4 is a block diagram showing the constitution of the automatic picture brightness and size regulating circuit for a display apparatus according to the present invention. FIG. 5 is a detailed circuit diagram for the circuit of FIG. 4. FIG. 6 illustrates the upper and lower limits of the picture brightness and size regulating circuit according to the present invention. FIG. 7 is a block diagram illustrating roughly FIG. 5.

The automatic picture brightness and size regulating circuit according to the present invention is constituted as follows. A current sensing section 100 senses the intensities of the beam currents which flow from a flyback transformer (FBT) to a cathode ray tube. The beam currents and the brightness are changed by first and second grids G1 and G2 operated by accepting a voltage outputted from the second wire of the FBT. In order to generate the pertinent beam current and brightness, the first wire operating time of the FBT is adjusted by using a PWM signal. Accordingly, the FBT can be called conceptually current sensing section. A microcomputer 300 decides a lower limit, so that a terminal (a of FIG. 5) voltage can be prevented from being lowered to below a certain level, if the terminal voltage is lowered anti-proportionally to the beam current as sensed by the current sensing section 100. Under this condition, the mentioned lower limit is a value which decides the maximum brightness restriction line and the picture size regulating degree in the display apparatus.

A brightness and picture size regulating circuit section 400 decides the upper limit of the terminal (a of FIG. 5) voltage so that the terminal voltage can be prevented from being too much lowered anti-proportionally to the intensity of the beam current as sensed by the current sensing section 100. The upper limit of the terminal voltage is decided in relation to the internal power and the internal impedance of a video pre-amplifier 200. Further, the brightness and picture size regulating circuit section 400 outputs brightness regulating signals ACL or auto contrast limit which is equal to ABL or auto brightness limit, to the video pre-amplifier 200 to adjust the clamp level of RGB video signals if the terminal voltage departs from the lower limit of the microcomputer 300. Further, the brightness and picture size regulating circuit section 400 outputs horizontal/vertical size regulating signals to a deflecting circuit to regulate the picture size.

The terminal (a of FIG. 5) of the brightness and picture size regulating circuit section 400 is connected to a plurality of resistors R15 and R16. In order to decide the upper limit, the plurality of the resistors R15 and R6 divide the voltage of the internal power of the video pre-amplifier 200.

Meanwhile, besides the plurality of the resistors R15 and R16, the brightness and picture size regulating circuit section 400 includes a plurality of diodes D4–D7 (which block the reverse voltage), so that the brightness regulating signals supplied to another video pre-amplifier (not illustrated) and the horizontal/vertical size regulating signals supplied to the deflecting circuit would not be influenced by composite regulating signals of the microcomputer 300. Further, the brightness and picture size regulating circuit section 400 includes: a resistor R17 for adjusting the adjustment sensitivity of the brightness and picture size regulating signals of the microcomputer 300; and resistors R18 and R 19 for regulating the difference between the brightness and picture size regulating signals. Further, the brightness and picture size regulating circuit section 400 is connected to vertical size and horizontal size regulating signal outputting terminals.

Reference code C6 indicates a capacitor which adjust the speed of responding to the horizontal size regulating signals.

Now the circuit for regulating the brightness and picture size in a display apparatus according to the present invention will be described as to its operations by referring to the attached drawings.

As shown in FIGS. 4 and 5, the brightness regulating signals are inputted into the video pre-amplifier 200 which is the first amplifying device for amplifying the RGB video signals. If the brightness regulating signal which is inputted into the video pre-amplifier 200 has a level of over 4.3 V, then a brightness restriction line is not formed by the brightness and picture size regulating circuit section 400. However, if the brightness regulating signal which is inputted into the video pre-amplifier 200 has a level of less than 4.3 V, then a brightness restriction line is formed by the brightness and picture size regulating circuit section 400.

To describe it in more detail, if the intensity of the beam current as sensed by the current sensing section 100 is increased, then the terminal (a of FIG. 5) voltage is lowered. Under this condition, the terminal voltage is lowered only to the lower limit which has been set up by the microcomputer 300. On the other hand, if the intensity of the beam current is lowered, then the terminal voltage rises owing to the internal power of the video pre-amplifier 200. Under this condition, the rising degree of the terminal voltage is limited by the upper limit which has been described above.

As shown in FIG. 6, as to the upper and lower limits, the terminal voltage is varied in accordance with the beam currents of the current sensing section 100. That is, the lower limit is decided by the composite adjusting signals of the microcomputer 300, while the upper limit is decided by the internal divided voltage and by the internal impedance of the video pre-amplifier 200.

Therefore, as described above, even if the terminal voltage is lowered due to a continuous increase in the intensity of the beam current (as sensed by the current sensing section 100), the terminal voltage does not go down below the lower limit, because the lower limit has been already established.

Generally, the lower limit makes the voltage level of the brightness regulating signal input terminal of the video pre-amplifier slightly lower than 4.3 V. Further, the lower limit adjusts the clamp level of the RGB video signals of the video pre-amplifier 200 so as to serve as a restriction line for restricting the brightness of the display apparatus to below a certain value.

Thus the maximum brightness restriction line is decided by the composite adjusting signals of the microcomputer 300, while the variation range of the picture size regulating signals is decided so as to decide the picture size regulating degree.

FIG. 7 shows a constitution wherein devices of FIG. 5 are divided as a block according to the function thereof. In FIG. 7, there are illustrated a bias circuit section 410 consisted of resistance R15 and R16, a condenser C6 which is a response speed controller 420, a cut-off circuit section 430 for cutting off a reverse bias voltage consisted of diodes (D4–D7) and a compensation circuit section 440 consisted of resistance R17, R18 and R19. The compensation circuit section is to regulate error when there is any error generated from composite adjusting signals, horizontal size regulating signals and vertical size regulating signals because of regulating based on brightness regulating signals.

According to the present invention as described above, the maximum brightness restriction line and the picture size regulating degree are decided by the composite adjusting signals of the microcomputer. Therefore, the manufacturing time can be saved during the manufacture of the display apparatus, and therefore, the productivity can be improved. Further, the constitution of the brightness and picture size regulating circuit section is very simple, and therefore, the economy is improved during its designing.

What is claimed is:

1. In a display apparatus for receiving and amplifying RGB signals from a computer main body to output them to a cathode ray tube, for supplying a high voltage from a fly back transformer to said cathode ray tube, and for carrying out horizontal deflections by a horizontal deflecting circuit, a circuit for regulating the brightness and picture size in said display apparatus, comprising:

a current sensing section for sensing intensities of beam currents incoming into said cathode ray tube;

a microcomputer for deciding a lower limit of a terminal voltage if the terminal voltage is lowered, the terminal voltage being anti-proportional to the beam current as sensed by said current sensing section; and a brightness and picture size regulating circuit section for deciding an upper limit of the terminal voltage in relation to an internal power and an internal impedance of a video pre-amplifier, for outputting brightness regulating signals to said video pre-amplifier to adjust a clamp level of RGB video signals if the terminal voltage departs from the lower limit of said microcomputer, and for outputting horizontal/vertical size regulating signals to a deflecting circuit section to regulate a picture size.

2. The circuit as claimed in claim 1, wherein a maximum brightness restriction line and a picture size regulating degree are simultaneously decided.

3. The circuit as claimed in claim 1, further comprising a plurality of resistors for voltage-dividing an internal power of said video pre-amplifier, and for deciding the upper limit of a brightness and picture size regulating degree by a divided voltage and by an internal impedance of said video pre-amplifier.

4. The circuit as claimed in claim 1, wherein said brightness and picture size regulating circuit section comprises:

a plurality of reverse voltage blocking devices for preventing malfunctions due to a reverse voltage;

a resistor for adjusting an adjustment sensitivity of the brightness and picture regulating signals of said microcomputer; and resistors respectively connected to vertical size and horizontal size regulating signal outputting terminals, for regulating differences between the brightness and picture size regulating signals.

5. A circuit regulating brightness and picture size in a display apparatus, comprising:

a current sensing section sensing intensities of beam currents entering a cathode ray tube;

a microcomputer determining a lower limit of a terminal voltage when the terminal voltage is lowered, said terminal voltage being anti-proportional to said beam current as sensed by said current sensing section;

a video pre-amplifier adjusting a clamp level of RGB video signals if said terminal voltage departs from said lower limit of said microcomputer and outputting horizontal/vertical size regulating signals to a deflecting circuit section to regulate a picture size; and a brightness and picture size regulating circuit determining an upper limit of said terminal voltage in relation to an internal power and an internal impedance of said video pre-amplifier.

6. The circuit of claim 5, a maximum brightness restriction line and a picture size regulating degree are simultaneously decided.

7. The circuit as claimed in claim 6, further comprising a pair of resistors for voltage-dividing an internal power of said video pre-amplifier, and for deciding the upper limit of said brightness and picture size regulating degree by a divided voltage and by an internal impedance of said video pre-amplifier.

8. The circuit of claim 7, said brightness and picture size regulating circuit comprises:

a plurality of reverse voltage blocking devices for preventing malfunctions due to a reverse voltage;

a resistor for adjusting an adjustment sensitivity of the brightness and picture regulating signals of said microcomputer; and a plurality of resistors respectively connected to vertical size and horizontal size regulating signal outputting terminals regulating differences between the brightness and picture size regulating signals.

9. The circuit of claim 8, said brightness and picture size circuit further comprises a capacitor that fixes a speed of responding to said horizontal size regulating signals.

10. The circuit of claim 9, said brightness and picture size circuit further comprises a plurality of diodes that block reverse voltage so that brightness regulating signals and said horizontal/vertical size regulating signals supplied to said deflecting circuit would not be influenced by composite regulating signals of said microcomputer.

11. A method of regulating brightness and picture size in a monitor, said method comprising the steps of:

setting a maximum voltage level of an input terminal of a brightness and picture size regulating circuit by dividing a power level of a preamplifier;

setting a minimum voltage level of said input terminal in response to a composite adjustment signal output from a microcomputer, wherein said input terminal is raised and lowered between said maximum and minimum voltage levels in response to a detected beam current of said monitor;

outputting to a first output terminal a brightness regulating signal from said input terminal via a first diode;

outputting to a second output terminal a vertical size regulating signal from said input terminal via a second diode and a first resistor; and outputting to a third output terminal a horizontal size regulating signal via a third diode and a second resistor.

12. The method as set forth in claim 11, wherein said step of setting a maximum voltage level comprises dividing said power level by third and fourth resistors connected in series between said preamplifier and said input terminal, said third resistor being coupled between said third diode and said input terminal.

13. The method as set fourth in claim 12, further comprising a step of adjusting a response time of said horizontal size regulating signal by connecting a capacitor between a ground terminal and a node commonly connecting said third resistor to said fourth resistor and said third diode.

14. The method as set fourth in claim 12, further comprising a step of regulating error, when there is any error generated from said composite adjustment signal by passing said composite adjustment signal through a fifth resistor, the composite adjustment signal being provided from said fifth resistor to said input terminal via a fourth diode.

15. The method as set fourth in claim 13, further comprising a step of regulating error, when there is any error generated from said composite adjustment signal by passing said composite adjustment signal through a fifth resistor, the composite adjustment signal being provided from said fifth resistor to said input terminal via a fourth diode.

\* \* \* \* \*